US010090123B2

(12) United States Patent
Neese et al.

(10) Patent No.: US 10,090,123 B2
(45) Date of Patent: Oct. 2, 2018

(54) ROTARY SWITCH

(71) Applicant: Nidec Motor Corporation, St. Louis, MO (US)

(72) Inventors: Thomas A. Neese, Columbus, IN (US); James P. Meagher, Indianapolis, IN (US); Charles V. Edwards, Columbus, IN (US); Robert D. O'Neil, Indianapolis, IN (US); Stephen M. Jones, Greenfield, IN (US)

(73) Assignee: Nidec Motor Corporation, St. Louis, MO (US)

( * ) Notice: Subject to any disclaimer, the term of this patent is extended or adjusted under 35 U.S.C. 154(b) by 8 days.

(21) Appl. No.: 15/343,378

(22) Filed: Nov. 4, 2016

(65) Prior Publication Data
US 2018/0130619 A1    May 10, 2018

(51) Int. Cl.
| *H01H 3/08*  | (2006.01) |
| *H01H 19/00* | (2006.01) |
| *H01H 19/14* | (2006.01) |
| *H01H 21/00* | (2006.01) |
| *H01H 1/58*  | (2006.01) |
| *H01H 9/02*  | (2006.01) |
| *H01H 9/16*  | (2006.01) |
| *H01H 19/06* | (2006.01) |
| *B60K 37/06* | (2006.01) |

(52) U.S. Cl.
CPC ............. *H01H 19/14* (2013.01); *B60K 37/06* (2013.01); *H01H 1/5805* (2013.01); *H01H 3/08* (2013.01); *H01H 9/0271* (2013.01); *H01H 9/16* (2013.01); *H01H 19/06* (2013.01); *B60K 2350/102* (2013.01); *B60K 2350/302* (2013.01); *H01H 2009/0285* (2013.01)

(58) Field of Classification Search
CPC .. H01H 3/00; H01H 3/02; H01H 3/08; H01H 3/10; H01H 9/00; H01H 9/0027; H01H 9/20; H01H 13/00; H01H 13/02; H01H 13/10; H01H 13/04; H01H 13/12; H01H 13/20; H01H 13/26; H01H 13/50; H01H 2003/08; H01H 2003/085; H01H 2003/10; H01H 2003/12; H01H 2221/00; H01H 2221/01; H01H 2221/012; H01H 19/14; H01H 1/5805; H01H 9/0271; H01H 9/16; H01H 19/06; H01H 2009/0285
USPC ... 200/336, 179, 19.01, 19.07, 19.18, 19.19, 200/19.22, 43.11, 43.12, 43.15, 43.19, 200/293, 327, 334; 116/DIG. 290, 249
See application file for complete search history.

(56) References Cited

U.S. PATENT DOCUMENTS

| 5,053,661 A * | 10/1991 | Kitamura ............. F16J 15/3232 277/565 |
| 6,549,113 B1 * | 4/2003 | Woodard ............. H01H 23/065 277/650 |
| 6,878,887 B2 * | 4/2005 | Amano .................... H01H 3/20 200/19.18 |

OTHER PUBLICATIONS

Mallory Automotive, GMI 700 4WD Switch Seal Proposal, Sep. 9, 2014, pp. 1-8.

* cited by examiner

*Primary Examiner* — Anthony R. Jimenez
(74) *Attorney, Agent, or Firm* — Senniger Powers LLP

(57) ABSTRACT

Rotary switches and associated methods. A rotary switch can include one or more arcuate passages which are prone to ingress of particulate or liquid contaminants. A gasket, a rib, and/or a lubricant reservoir can be provided in the arcuate passages for blocking ingress of contaminants to an interior of the switch.

20 Claims, 6 Drawing Sheets

ROTARY SWITCH

FIELD

The present disclosure generally relates to a switch, and more particularly to a rotary type switch.

BACKGROUND

Switches of various kinds are used in many settings to make electrical connections. One type of switch is a rotary switch. Rotary switches can be used in many situations. For example, rotary switches are commonly used in control systems for automobiles or other vehicles. Rotary switches are also used in other types of control systems.

This background discussion is intended to provide information related to the present disclosure which is not necessarily prior art.

SUMMARY

One aspect of the present disclosure is directed to a rotary switch including an actuator support and an actuator. The actuator support includes a housing. The housing has an interior. Electrical circuitry in the housing interior is provided for making at least one electrical connection. The actuator is operatively connected to the electrical circuitry and rotatable with respect to the actuator support for making the at least one electrical connection. An arcuate gap is between the actuator and the actuator support. A gasket is in the arcuate gap and in engagement with the actuator and actuator support for blocking ingress of contaminants to the housing interior. The gasket is formed separately from the actuator and the actuator support and comprises resiliently compressible material.

Another aspect of the present disclosure is directed to a rotary switch including an actuator support and an actuator. The actuator support includes a housing. The housing has an interior. Electrical circuitry in the housing interior is provided for making at least one electrical connection. The actuator is operatively connected to the electrical circuitry and rotatable with respect to the actuator support for making the at least one electrical connection. An inlet is between the actuator support and the actuator. An arcuate lubricant reservoir is between the actuator and the actuator support and is configured for holding a lubricant for blocking ingress of contaminants to the housing interior from the inlet.

Yet another aspect of the present disclosure is directed to a rotary transfer case selector switch. The switch includes a housing having an interior. Electrical circuitry in the housing interior is provided for making at least one electrical connection. A knob extending from the housing includes a post and a wheel. The wheel is operatively connected to the electrical circuitry and rotatable about the post for making the at least one electrical connection. The knob has an arcuate gap between the post and the wheel. A gasket formed separately from the post and the wheel is positioned between the post and the wheel in the arcuate gap for blocking ingress of contaminants to the housing interior through the arcuate gap. The gasket comprises a resiliently compressible material.

This summary is not intended to identify essential features of the disclosed switch and is not intended to limit the scope of the appended claims. Various other aspects and advantages of the switch of the present disclosure will be apparent from the following detailed description and the accompanying drawings.

BRIEF DESCRIPTION OF THE DRAWINGS

Corresponding reference characters indicate corresponding parts throughout the drawings. The drawings are not intended to limit the scope of the appended claims to the specific illustrated embodiment. The drawings are not necessarily to scale.

DETAILED DESCRIPTION

The following detailed description of embodiments of switches references the accompanying figures. The description is intended to describe aspects in sufficient detail to enable those with ordinary skill in the art to make and use the claimed switch. Other embodiments can be utilized and changes can be made without departing from the scope of the appended claims. The following description is, therefore, not limiting. The scope of the present invention is defined only by the appended claims, along with the full scope of equivalents to which the claims are entitled.

In this description, references to "one embodiment", "an embodiment", or "embodiments" mean that the feature or features referred to are included in at least one embodiment. Separate references to "one embodiment", "an embodiment", or "embodiments" in this description do not necessarily refer to the same embodiment and are not mutually exclusive unless so stated. Specifically, a feature, structure, step, etc. described in one embodiment can also be included in other embodiments, but is not necessarily included. Thus, particular implementations of the claims can include a variety of combinations and/or integrations of the embodiments disclosed herein.

Figure 1:
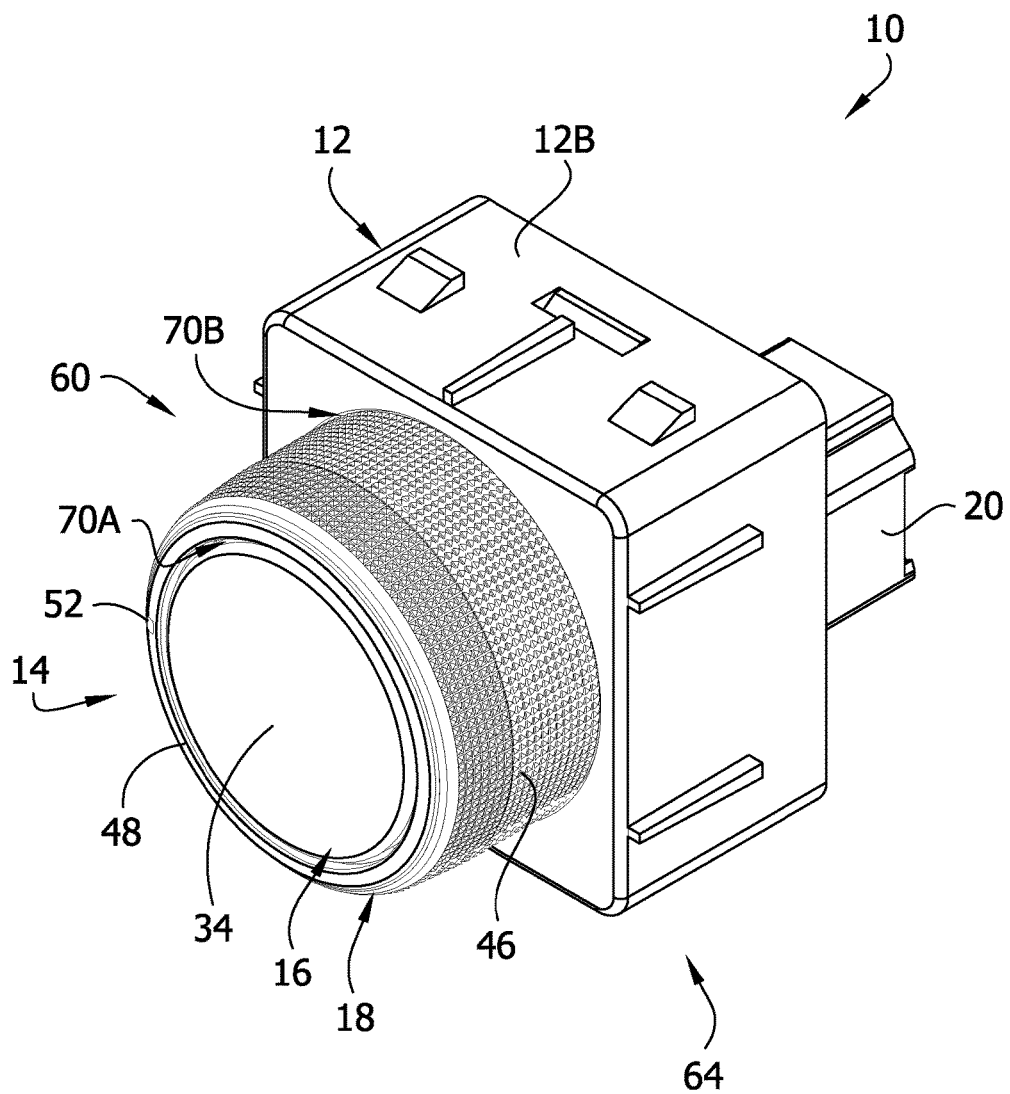
FIG. 1 is a front perspective of a rotary switch of the present disclosure.

Referring to the drawings, FIG. 1 illustrates one embodiment of a rotary switch embodying aspects of the present invention, designated generally by the reference number 10. The rotary switch can be used in various control systems for selectively making one or more electrical connections. For example, in a particular embodiment, the rotary switch 10 can be referred to as a transfer case selector switch and be used on an automobile or other vehicle as a switch for changing between two-wheel drive and four-wheel drive. The rotary switch 10 can also be used in other scenarios and as part of other control systems. As described in further detail below, the switch of the present disclosure is designed to be resistant to ingress of contaminants, such as particulates (e.g., dust) and liquids (e.g., water and other liquids, etc.) from an exterior of the switch to an interior of the switch.

Figure 2:
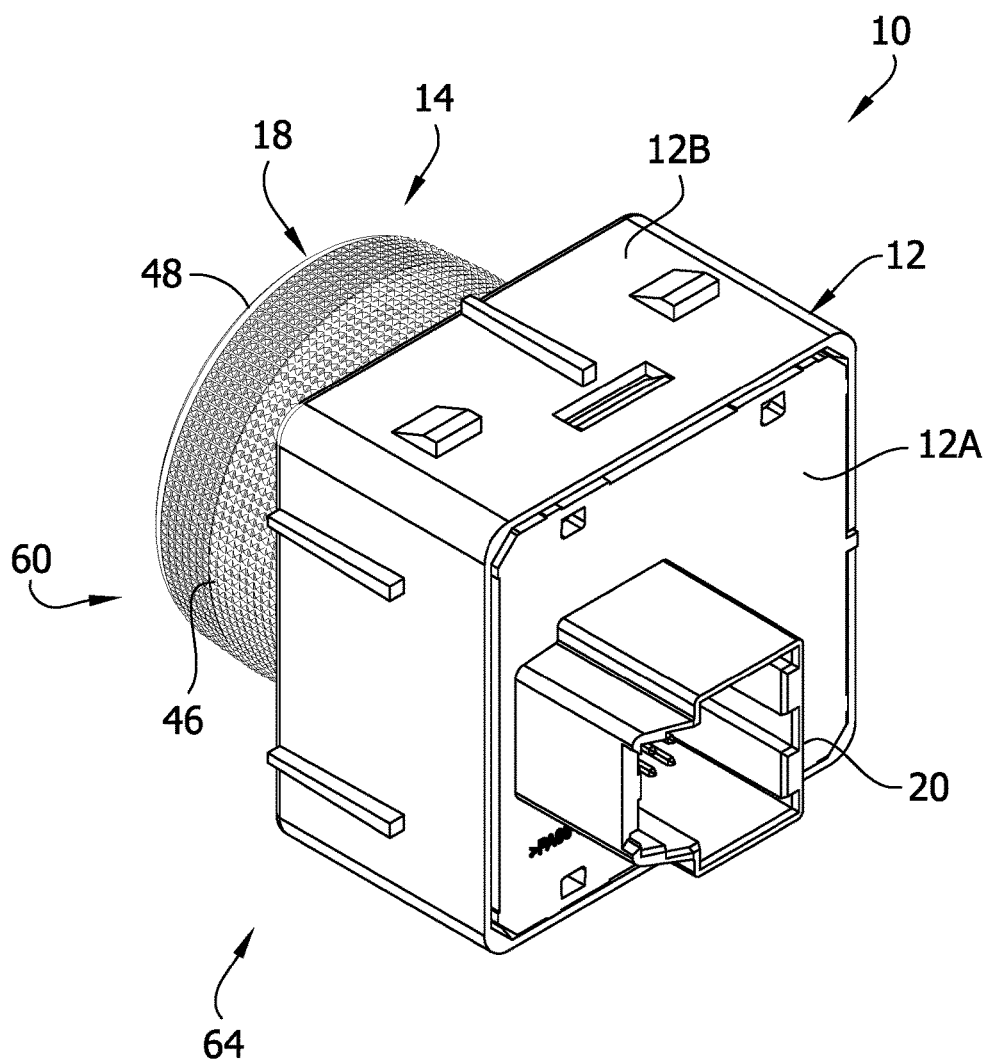
FIG. 2 is a rear perspective of the rotary switch.

As shown in FIGS. 1 and 2, the switch 10 includes a housing 12 and a generally cylindrical knob 14 extending from the housing. As described in further detail below, the knob 14 includes a post 16 and a wheel 18 rotatable about the post. An electrical connector 20 is provided on a rear side of the housing 12 (FIG. 2) for electrically connecting the switch to a desired electrical system. It will be appreciated that in use, the switch 10 may be mounted such that the housing 12 is hidden behind a facade such as a panel of a dashboard and the knob protrudes through an opening of the facade so a user can rotate the wheel to actuate the switch.

Figure 4:
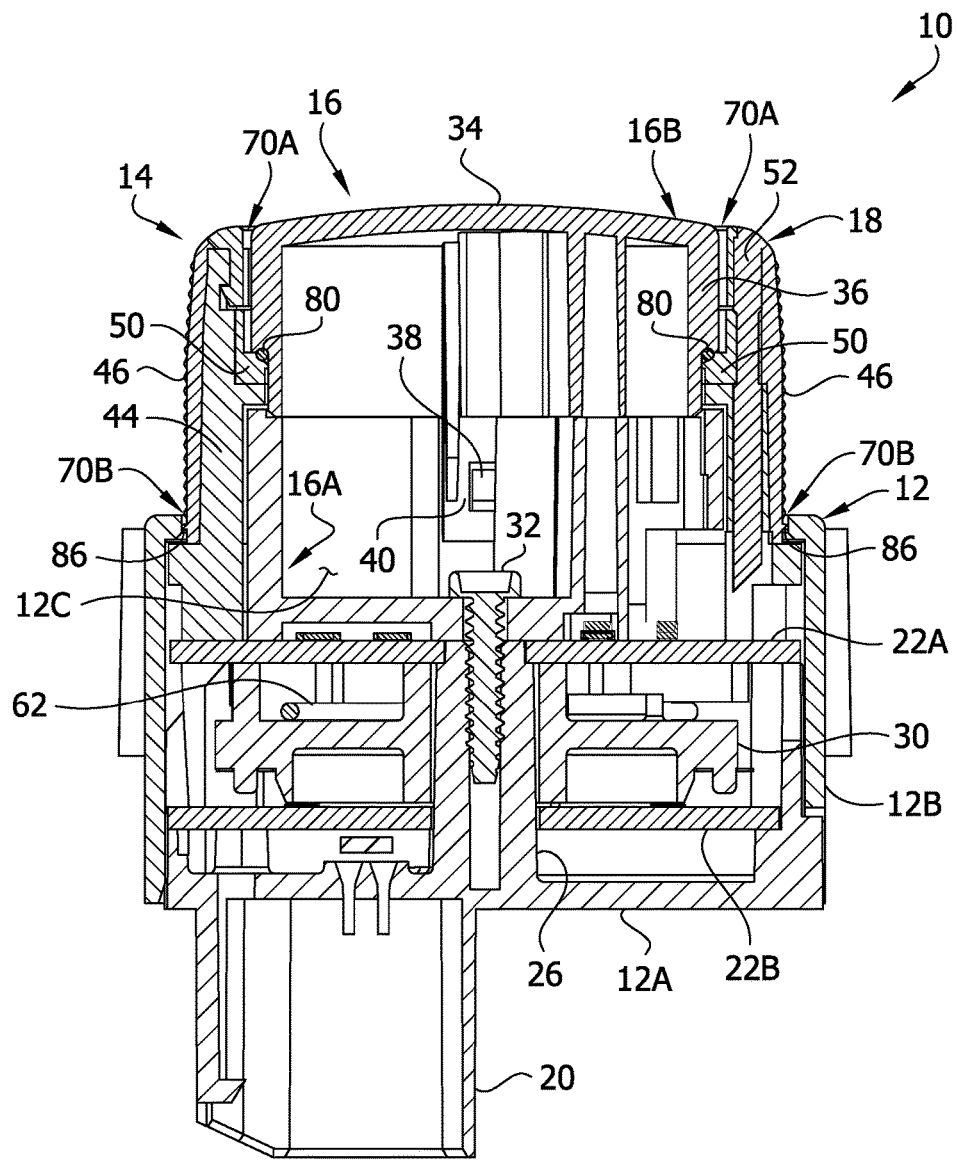
FIG. 4 is a section of the rotary switch taken in the plane including line 4-4 of FIG. 1.

Referring to FIG. 4, the housing includes a rear housing portion 12A, a front housing portion 12B, and a housing interior 12C. The housing portions are formed of injection molded plastic or another suitable material. Electrical circuitry of the switch 10 is housed in the interior 12C. For example, first (forward) and second (rear) printed circuit boards 22A, 22B (broadly "electrical component supports") are shown in the housing 12. It will be understood that the printed circuit boards 22A, 22B mount resistors, contacts, and various other electrical components. The rear housing portion 12A includes a stem 26 on which the first and second printed circuit boards 22A, 22B are mounted. A rotor 30 is rotatably mounted on the stem 26 and positioned between the printed circuit boards 22A, 22B. As described in further detail below, the rotor 30 is operatively connected to the wheel 18 to permit the user to actuate the rotor by rotating the wheel.

Still referring to FIG. 4, the post 16 has a generally hollow construction and includes a base 16A and a head 16B. The base 16A is secured to a distal end of the stem 26 by a screw 32 (broadly "fastener"), which also secures the first printed circuit board 22A to the distal end of the stem. The head 16B includes a face 34 and a face support 36. The face support 36 includes latches 38 connecting with latches 40 of the base 16A. The base 16A and face support 36 are interior components of the knob 14. The face 34 is exposed and forms a face of a distal end of the knob 14. In the illustrated embodiment, the post 16 is stationary. However, in other embodiments, the post 14 or components thereof are selectively movable (e.g., rotatable) with respect to the housing 12. Components of the post 16 are formed of injection molded plastic or another suitable material.

The wheel 18 generally includes a hub 44 and a grip 46. The hub 44 is generally tubular and serves as a support for the grip 46. The hub 44 is formed of injection molded plastic or another suitable material. The grip 46 forms a generally cylindrical side wall of the knob 14. In the illustrated embodiment, the grip 46 is formed of a different material than the hub 44. The hub 44 serves as a generally rigid substrate onto which the grip 46 is overmolded. The grip is formed of a polyolefin elastomer, thermoplastic vulcanizate, or another suitable material. Desirably, the grip 46 is softer than the hub 44 and provides a soft touch feel for the user. In other embodiments, the grip 46 is formed of the same material as the hub 44. Desirably, the exterior surface of the grip 46 is textured (e.g., includes a plurality of nubs, as shown in FIG. 1) for providing friction with fingers of a user. In the illustrated embodiment, the wheel 18 also includes a rim 48. The rim 48 is connected to a distal end of the hub 44. The rim 48 is formed of chrome for aesthetics, but other suitable materials can be used. In other embodiments, the rim 48 is omitted or formed as the same piece as the hub 44 and/or grip 46. As is now apparent, the grip 46 and the rim 48 of the wheel 18 and the face 34 of the post 16 generally form the exterior surface of the knob 14.

As will be described in further detail below, in the illustrated embodiment, the wheel 18 includes an overmolded layer 50 (FIG. 5) on the interior of the hub 44. The overmolded layer 50 is overmolded on the hub 44 at the same time as the grip 46 and is formed of the same material as the grip, such as a polyolefin elastomer, thermoplastic vulcanizate, or another suitable material. Desirably, the overmolded layer 50 is formed of a material that is resiliently compressible and softer than the hub 44.

The wheel 18 includes an indicator 52 (FIGS. 1 and 4) to indicate the rotated position of the wheel 18 with respect to the post 16. The face 34 can include corresponding indicators (not shown) to indicate to the user electrical connections made or not made when the wheel 18 is rotated to positions with respect to the post 16. For example, the face 34 can include a two-wheel drive indicator, a four-wheel drive indicator, etc. Other suitable indicators can be used, based on the desired use for the switch 10.

Figure 3:
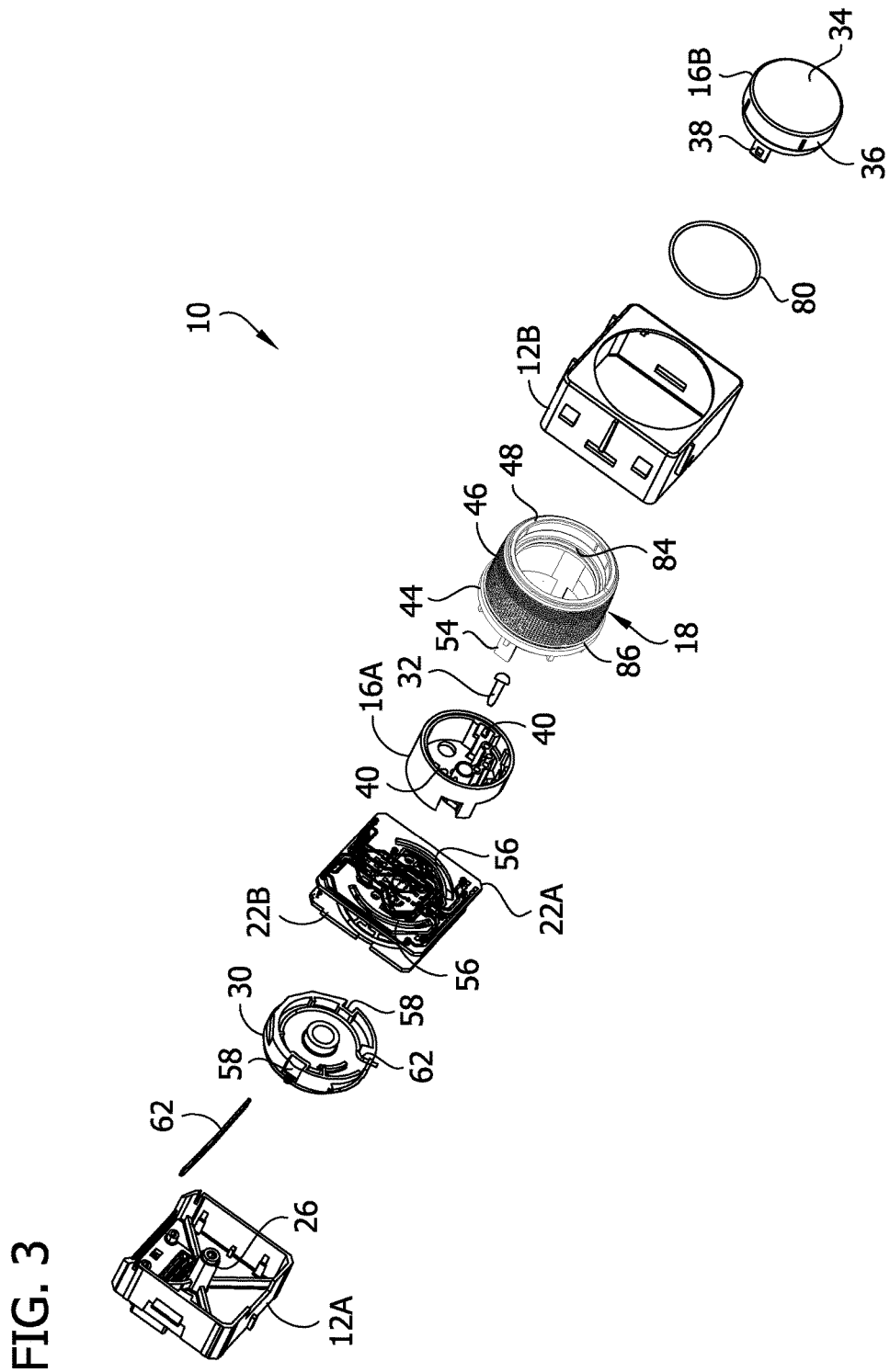
FIG. 3 is an exploded perspective of the rotary switch.

The wheel 18 can be rotated by a user to rotate the rotor 30 and thus actuate the switch 10. The wheel 18 is operatively connected to the rotor 30 such that the rotor rotates conjointly with the wheel when a user applies rotational force to the grip 46. As shown in FIG. 3, in the illustrated embodiment, the wheel 18 is operatively connected to the rotor 30 by protrusions 54 at a lower end of the hub 44 extending through arcuate slots 56 in the first printed circuit board 22A into receivers 58 in an upper end of the rotor 30. As will be appreciated, in one or more rotated positions, the rotor 30 makes at least one electrical connection to complete a circuit in conjunction with the electrical circuitry, thus "closing" the switch 10.

The wheel 18 and rotor 30 can be referred to collectively as an actuator 60 of the switch 10. The actuator 60 rotates with respect to the post 16 and housing 12 for actuation of the switch. One or more springs 62 (broadly "biasing elements") (FIG. 3) can be used to bias the actuator 60 and/or maintain the actuator in one or more positions.

The post 16 and the housing 12 can be collectively referred to as an actuator support 64 of the switch 10. The actuator 60 is rotatable with respect to the actuator support 64 for actuating the switch. In the illustrated embodiment, the housing 12 and post 16 remain stationary, and the actuator 60 rotates with respect to the housing and post. However, in other embodiments, components of the actuator support 64 can be movable yet still be considered an actuator support with respect to the actuator 60. For example, it is contemplated that the face 34 could serve as a movable push button or be selectively rotatable independent from the wheel 18.

The switch 10 includes two locations that are potentially prone to ingress of contaminants such as particulates and liquids. In particular, the switch 10 has a first annular passage 70A between the wheel 18 and the post 16 and a second annular passage 70B between the wheel and the housing 12. Both passages 70A, 70B serve as potential passageways for contaminants to enter the interior of the housing 12. Liquid entering the switch 10 can be particularly problematic in adversely affecting the electrical circuitry and associated components in the switch, potentially causing failure of the switch. Accordingly, it is desirable to block such contaminants from entering the switch 10.

Figure 5:
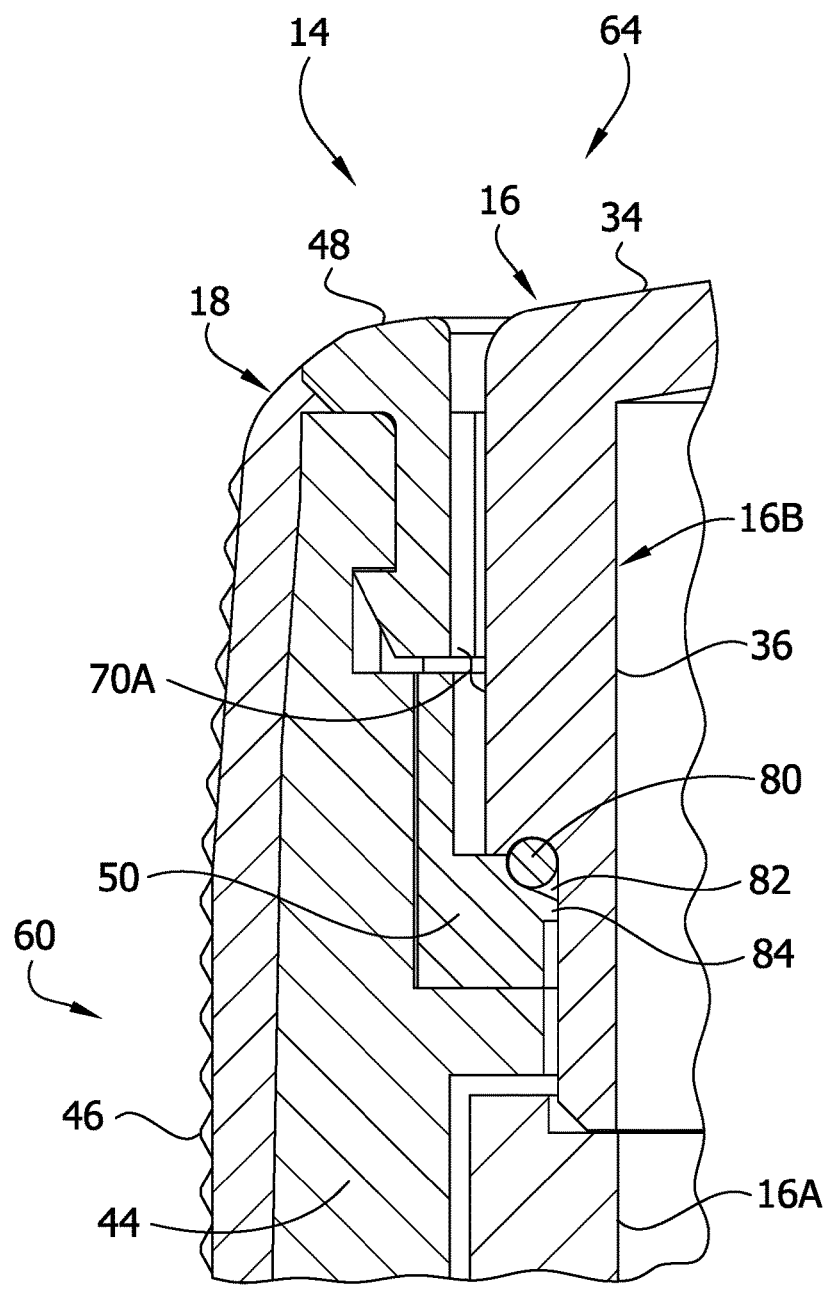
FIG. 5 is an enlarged portion of the section of FIG. 4 showing an interface of a wheel and a post of a knob of the switch.

As shown in FIGS. 4 and 5, the interface of the wheel 18 and the post 16 in the first annular passage 70A is constructed for blocking contaminants from entering the interior 12C. The annular passage 70A includes an annular inlet at the exterior surface of the knob 14 between the exterior edge of the face 34 and the edge of the rim 48. The annular passage 70A extends "downstream" (potential flow direction of contaminants) from the annular inlet toward the interior of the housing 12. Three forms of defense are provided for blocking contaminants from migrating through the annular passage 70A to the housing interior 12C.

A first form of defense against contaminants is an annular O-ring 80 (broadly "gasket") positioned between the wheel 18 and the post 16. The O-ring 80 is positioned in an annular gap forming part of the annular passage. More specifically, in the illustrated embodiment, the overmolded layer 50 and the face support 36 define respective annular recesses for receiving the O-ring. The annular recesses have cross-sectional shapes corresponding to the cross-sectional shape of the O-ring. Collectively, the recesses provide the annular passage with an annular cavity having a rounded, more specifically substantially circular, cross-sectional shape for housing the O-ring 80. The O-ring is slightly oversized in thickness (e.g., by about 0.2 mm) for providing a sealing interference fit against both the overmolded layer 50 and the face support 36. The O-ring 80 engages and is slightly resiliently compressed by the wheel 18 and the post 16 when installed in the annular cavity, which enhances the seal made by the O-ring. In use, the O-ring may or may not rotate with the wheel 18. The O-ring is not fixedly connected to the post 16 to prevent rotation of the O-ring with the wheel and is not fixedly connected to the wheel 18 to cause rotation of the O-ring with the wheel.

A second form of defense against contaminants is an annular reservoir 82 containing lubricant (e.g., grease). In the illustrated embodiment, the wheel 18 and the post 16 are shaped to provide the annular passage with the annular lubricant reservoir downstream from the O-ring 80. The lubricant reservoir 82 is bounded by the overmolded layer 50, the face support 36, and the O-ring 80. Desirably, the lubricant reservoir 82 contains a lubricant suitable for acting as a seal against liquids that might pass the O-ring 80. For example, a lubricant such as PTFE thickened perflouropolyether grease can be used. Desirably, the lubricant exhibits minimal change in viscosity over a wide range of temperatures in which the switch 10 is expected to be used.

A third form of defense is an annular rib 84 downstream from the lubricant pocket. The rib 84 is formed as part of the overmolded layer 50 of the wheel 18. Desirably, the rib 84 is slightly oversized (e.g., by about 0.2 mm) to provide an interference fit with the side of the post 16. In the assembled state of the switch 10, the rib 84 engages and is resiliently compressed against the side of the face support 36 to provide enhanced sealing against the post 16.

Figure 6:
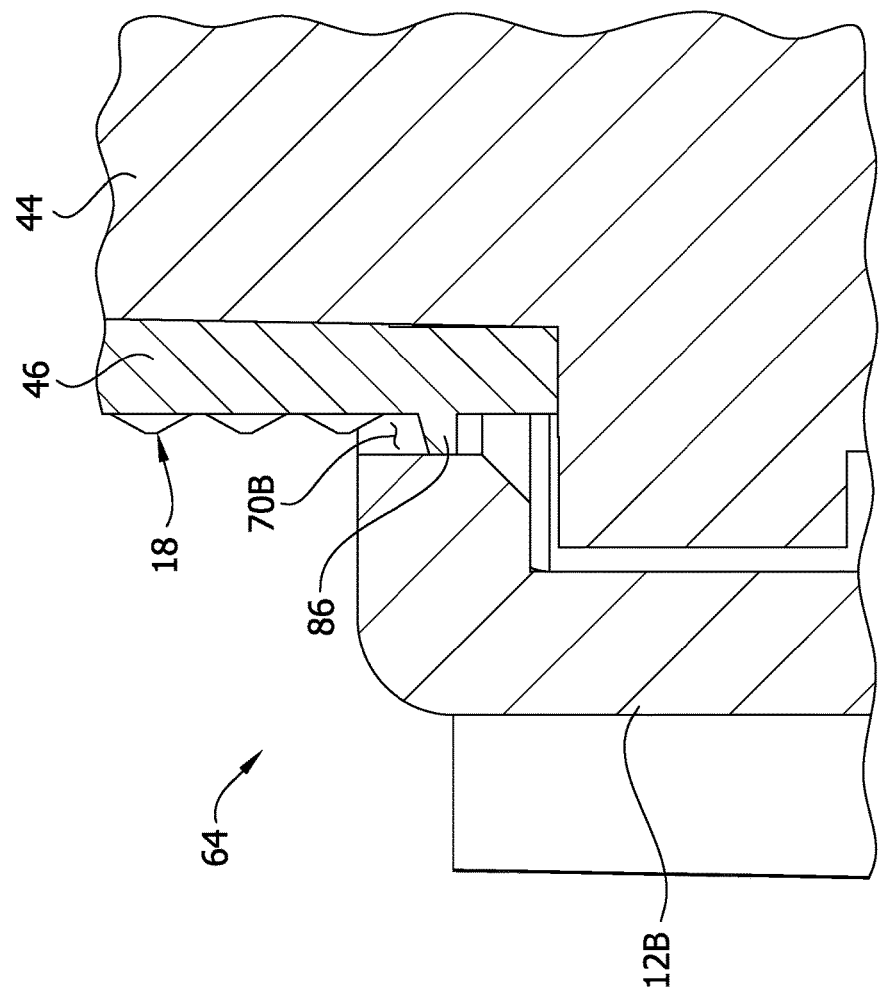
FIG. 6 is an enlarged portion of the section of FIG. 4 showing an interface of the knob and a housing of the switch.

Now referring to FIG. 6, the interface of the wheel 18 and the housing 12 in the second annular passage 70B is constructed for blocking contaminants from entering the interior 12C of the housing 12. The annular passage 70B includes an annular inlet between a rim of the housing 12 and the grip 46 of the wheel 18. The annular passage 70B extends "downstream" from the annular inlet toward the interior 12C. One form of defense is provided for blocking contaminants from migrating through the annular passage 70B to the housing interior 12C. An annular rib 86 is formed as part of the grip 46 of the wheel. Desirably, the rib 86 is slightly oversized (e.g., by about 0.25 mm) to provide an interference fit with the side of the post 16. In the assembled state of the switch 10, the rib 86 engages and is resiliently compressed against the housing 12 to provide enhanced sealing.

It will be appreciated that components described above as being annular can broadly be referred to as arcuate in the sense that an annular shape includes several arcuate segments. Accordingly, for example, the annular passages 70A, 70B can be referred to as arcuate passages 70A, 70B, and the annular lubricant reservoir 82 can be referred to as an arcuate lubricant reservoir 82, etc. Moreover, it will be appreciated that the annular (or arcuate) components extend around the axis of rotation of the wheel 18.

Referring to FIG. 3, the rotary switch 10 can be manufactured by sandwiching the rotor 30 with the two printed circuit boards 22A, 22B and then threading those components onto the stem 26 of the rear housing portion 12A. The base 16A of the post 16 is then positioned over the distal end of the stem 26. The screw 32 is installed to secure the base 16A and components thereunder in position. The assembled wheel 18 is received over the base 16A, and the front housing portion 12B is installed over the wheel. The rib 86 becomes compressed against the housing for sealing out contaminants at the second annular passage 70B. The O-ring 80 is assembled on the head 16B of the post 16. A bead of lubricant is applied to the inner side of the O-ring 80 where it abuts the face support 36. The head 16B is moved into the central opening of the wheel 18, and the face support 36 latches to the base 16A to retain the head 16B on the base. The O-ring 80 is compressed by the wheel 18 and the post 16, the lubricant rests in the lubricant reservoir 82, and the rib 84 is compressed against the side of the post 16. Other methods of manufacture can be used.

Rotary switches constructed according to the embodiment disclosed herein have been tested and found to be satisfactory in preventing liquid and other contaminates from entering the switch at the first and second annular passages 70A, 70B. However, it will be understood that features disclosed herein can be omitted and/or modified without departing from the scope of the present invention. For example, it is contemplated that an O-ring and/or lubricant reservoir can be provided in the second annular passage in essentially the same fashion as provided in the first annular passage.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Although examples of the features claimed below have been described in various embodiments above, it will be understood that equivalents can be employed and substitutions can be made without departing from the scope of the claims.

What is claimed is:

1. A rotary switch comprising:
    an actuator support including a housing, the housing having an interior;
    electrical circuitry in the housing interior for making at least one electrical connection;
    an actuator operatively connected to the electrical circuitry and rotatable with respect to the actuator support for making the at least one electrical connection;
    an arcuate gap between the actuator and the actuator support; and
    a gasket in the arcuate gap and in engagement with the actuator and actuator support for blocking ingress of contaminants to the housing interior, the gasket being formed separately from the actuator and the actuator support and comprising resiliently compressible material;
    wherein the actuator support includes a post and the actuator includes a wheel, the wheel being rotatable about the post for making the at least one electrical connection, the wheel and post forming a knob extending from the housing;
    wherein the arcuate gap is between the wheel and the post.
2. A rotary switch as set forth in claim 1, wherein the gasket comprises an O-ring having a rounded cross-sectional shape.

3. A rotary switch as set forth in claim 1, wherein the actuator and the post define respective recesses in which the gasket is received.

4. A rotary switch as set forth in claim 1, wherein the actuator includes a hub and an overmolded layer between the hub and the actuator support, the overmolded layer comprising a rib extending toward and engaging the actuator support for blocking ingress of contaminants to the housing interior.

5. A rotary switch as set forth in claim 1, wherein the arcuate gap is part of an annular gap between the actuator and actuator support, and the gasket is in the annular gap for blocking ingress of contaminants to the housing interior through the annular gap.

6. A rotary switch as set forth in claim 1, wherein at least one of the actuator and the actuator support defines a recess in which the gasket is received.

7. A rotary switch as set forth in claim 6, wherein the recess has a shape corresponding to a shape of the gasket.

8. A rotary switch as set forth in claim 7, wherein the gasket has a rounded shape and the recess has a corresponding rounded shape.

9. A rotary switch as set forth in claim 6, wherein the actuator includes a hub and an overmolded layer between the hub and the actuator support, the overmolded layer defining the recess.

10. A rotary switch as set forth in claim 1, further comprising an arcuate lubricant reservoir between the actuator and actuator support, the lubricant reservoir having lubricant therein for blocking ingress of contaminants to the housing interior.

11. A rotary switch as set forth in claim 10, wherein the lubricant reservoir is defined at least in part by a recess in the actuator support.

12. A rotary switch as set forth in claim 10, wherein the lubricant reservoir is at least partially bounded by the gasket.

13. A rotary switch as set forth in claim 10, wherein the arcuate lubricant reservoir is part of an annular lubricant reservoir between the wheel and the post.

14. A rotary switch as set forth in claim 10, wherein the lubricant reservoir is positioned to block ingress of contaminants to the housing interior from the arcuate gap.

15. A rotary switch comprising:
an actuator support including a housing, the housing having an interior;
electrical circuitry in the housing interior for making at least one electrical connection;
an actuator operatively connected to the electrical circuitry and rotatable with respect to the actuator support for making the at least one electrical connection;
an inlet between the actuator support and the actuator;
an arcuate lubricant reservoir between the actuator and the actuator support configured for holding a lubricant for blocking ingress of contaminants to the housing interior from the inlet;
an arcuate gap between the actuator support and the actuator; and
a gasket in the arcuate gap between the actuator support and the actuator;
wherein the actuator support includes a post and the actuator includes a wheel, the wheel being rotatable about the post for making the at least one electrical connection;
wherein the arcuate gap and gasket are between the wheel and the post.

16. A rotary switch as set forth in claim 15, wherein at least one of the actuator and the actuator support includes a substrate and an overmolded layer, the overmolded layer at least partially bounding the lubricant reservoir.

17. A rotary switch as set forth in claim 16, wherein the overmolded layer defines a recess in which the gasket is received for blocking ingress of contaminants to the housing interior.

18. A rotary switch as set forth in claim 15, wherein the gasket at least partially bounds the lubricant reservoir.

19. A rotary transfer case selector switch comprising:
a housing having an interior;
electrical circuitry in the housing interior for making at least one electrical connection;
a knob extending from the housing, the knob including a post and a wheel, the wheel being operatively connected to the electrical circuitry and rotatable about the post for making the at least one electrical connection, the knob having an arcuate gap between the post and the wheel; and
a gasket formed separately from the post and the wheel, the gasket positioned between the post and the wheel in the arcuate gap for blocking ingress of contaminants to the housing interior through the arcuate gap, the gasket comprising a resiliently compressible material.

20. A rotary switch as set forth in claim 15, wherein the arcuate lubricant reservoir is between the wheel and the post.

* * * * *